3,012,980
AEROSOL SPRAYABLE COMPOSITIONS
John E. Dereich, Painesville, Ohio, assignor to Diamond Alkali Company, Cleveland, Ohio, a corporation of Delaware
No Drawing. Filed May 26, 1958, Ser. No. 737,548
16 Claims. (Cl. 260—22)

This invention relates to coating compositions, and more particularly to coating compositions which are ordinarily clear and colorless, but which are compatible with various dyes and pigments, and still more particularly to coating compositions of the above types which are amenable to aerosol packaging and to methods of using these compositions.

In a coating composition, for most applications, it is desirable that the coating, when applied to some object, be quick drying, thereby enabling one to coat the object and then use it immediately without waiting for the coating to dry. In recent years, for ease in application and use, many compositions, including various types of coatings, have been packaged in aerosol containers. However, this type of packaging has presented problems, in that, often coating compositions which are known to have desirable characteristics, such as being quick drying have been found not to be compatible with the components of the aerosol system. Often, the propellants, which are used in aerosol packaging, which propellants are generally fluorinated lower hydrocarbons, commonly known by the trade name, Freon, cause the precipitation of the constituents of many coating compositions, thereby preventing their use in aerosol applications. Particularly, such materials as the chlorinated rubbers, used in paints, for example, are thus adversely affected in aerosol use. It has therefore been necessary to change the constituents of these coating compositions in order to achieve a composition which is compatible with the aerosol propellants. Unfortunately, however, the coating compositions which have resulted from these changes, have often proved to be toxic as well as flammable, thus presenting a considerable health and safety hazard, both to the user, as well as to those in close proximity to him.

Additionally, in the past, for every different use, it has been found to be necessary to formulate a different coating composition. For example, one coating composition is used for forming a protective coating on metal while another is used for a shoe polish, and still a third and different composition is required as a touch-up plaint. The reason for this wide variety of compositions has been because no one composition has had the necessary characteristics for use in all of these applications. For example, the coating itself has not been producible both as a clear, colorless film as well as a colored one, and, additionally, the film produced has not been both hard enough for paint uses and yet flexible enough for uses such as a shoe polish. Because of this, coupled with the almost universal flammability and/or toxicity of the composition in aerosol use, none of the prior art coating compositions have been completely satisfactory.

It is therefore an object of the present invention to provide a coating composition which may be successfully used in a number of wide and varied applications.

Another object of this invention is to provide a coating composition of the above type which may be readily packaged in aerosol-type containers.

A further object of this invention is to provide a coating composition as described above, which composition is both non-toxic and non-flame propagating, in aerosol use.

These and other objects will become apparent to those skilled in the art from the description of the invention which follows.

It has now been found, that a coating composition containing a major amount of a chlorinated paraffin and minor amounts of at least one of the following film-forming agents, plasticizers, "slip" agents, and dryers, dispersed in a suitable solvent, is readily adaptable for aerosol packaging, and may be used either pigmented or as a clear, colorless film, in many and varied applications, as for example, as a protective coating for metals, as a shoe polish, as a touch-up paint, as a floral spray both for foliage and plants as well as for the material incorporated therewith as background, etc., as a decorative coating for plastics, and for many other similar and different applications.

The composition of the present invention includes a major portion of a highly chlorinated aliphatic material preferably averaging from 18–36 carbon atoms in the molecule thereof and preferably containing from about 66–80% of chemically combined chlorine, a minor amount of a film-forming agent, and lesser amounts of at last one of the following: plasticizers, "slip" agents, and dryers. The highly chlorinated aliphatic material comprises highly chlorinated aliphatic hydrocarbons and mixtures thereof, such as chlorinated paraffin wax, containing 66–80% of chemically combined chlorine and having an average molecular weight corresponding to a $C_{24}$ carbon atom chain, chlorinated to the extent indicated, excellent results being achieved by using specifically a chlorinated paraffin wax having the empirical formula $C_{24}H_{29}Cl_{21}$.

The film-forming agent in the present composition is preferably polyvinyl acetate, which material has been found to be completely compatible with the propellants, solvents, and carriers, ordinarily used in aerosol packaging. However, other materials such as polyvinyl stearate may also be used with equally good results. As plasticizers, in the present composition, the following had been found to be satisfactory: butyl benzylphthalate, soya modified alkyd resins, such as those containing phthalic anhydride, polyvinyl stearate, and the sorbitan monolaurates, such as polyoxyethylene sorbitan monolaurate. Cobalt naphthanate and lead naphthanate have been found to be satisfactory dryers. Additionally, it has it has been found desirable to incorporate in the present composition small amounts of materials which will give a better "slip" to the coating, i.e., give the coating a smooth feel to the touch, such as one of the various silicone resins. Where the coating composition of the present invention is to be used for extended periods in exposure to direct sunlight, it has been found desirable to incorporate therein a material which will absorb the ultraviolet rays, thereby preventing a discoloration of the chlorinated paraffin material. Exemplary of such materials are the substituted benzophenones such as 2-hydroxy-4-methoxy benzophenone, 2-hydroxy-4,4'-dimethoxy benzophenone, and 2,2'-dihydroxy-4,4'-dimethoxy benzophenone.

By the term "film-forming agent," as used in the specification and claims, is meant a material which in admixture with the chlorinated paraffinic material and a solvent, upon removal of the solvent, will cause the formation of a smooth, hard continuous layer of the chlorinated paraffinic material in a very short time. Examples of such materials have been shown above. The purpose of a plasticizer is to give this film which is formed a flexibility, thereby making the coating composition suitable for many more applications than would ordinarily be possible. The hardening or drying of this film is accelerated by the use of the dryers, i.e., lead and cobalt naphthanate, as set forth above. Although these materials are conventional dryers, frequently used in paints, the mechanics of their action in the present composition is not known, inasmuch as there are no double bonds which may be oxidized to speed up drying, as is the case with paints. However, without these dryers present, the final hardening of the coating is lengthened by several minutes.

In the present composition, the chlorinated paraffin is present in amounts ranging from 60-85% by weight of the total composition, the preferred range being 79-80% by weight of the total composition. The polyvinyl acetate film-forming agent is present in amounts ranging from 10-40% by weight of the total composition, with the preferred range being 19-20%. The remaining ingredients, i.e., plasticizers, dryers, and "slip" agents, are present in a total amount from about 1-5% by weight of the total composition, preferably 1-2%. Additionally, it has been found, that where polyvinyl stearate is used as the film-forming agent, a very satisfactory coating composition may be made using only 1% by weight of the total composition of the polyvinyl stearate and 99% by weight of the total composition of the chlorinated paraffinic material. When an ultraviolet-absorbing agent is incorporated in the present composition, it is used in amounts of .1-1% by weight of the total composition, .1-.5% being the preferred range.

In order to render the above composition, which is a solid composition, suitable for coating applications, it is dissolved in any suitable solvent so as to make a solution containing about 5-40% by weight of the above composition, 35-40% being the preferred amount. At the present time, toluene is the preferred solvent, although other solvents such as kerosene, xylene, naphthalene, trichlorethylene, and perchlorethylene may also be used. This solution, containing 5-40% by weight of the coating composition, may then be combined with aerosol propellent carriers and solvents, such as methylene chloride, and Freons for aerosol packaging, or may be air sprayed or brushed onto any desired surface. Where aerosol packaging is to be used, it has been found desirable to incorporate about 2 parts by weight methylene chloride with 1 part by weight of the solvent composition, thereby making it necessary to add only the Freon components for aerosol use. Upon applying the above composition to a surface, within about one minute, a clear, colorless, glossy, hard, flexible coating is formed.

Additionally, it will be obvious to those skilled in the art that where a colored coating is desired, any desired pigment or oil-soluble dye may also be added to the coating solution, prior to aerosol packaging or other application. Such incorporated pigments and dyes are not found to deleteriously affect the coating composition, but are found to become completely dispersed therein, so that upon drying, a coating of uniform color is formed which is not readily removed from the surface either in ordinary use or by washing with soap or detergents and water. This coating, however, is removable by solvents having a low kauri-butanol (KB) number, such as those listed above, and hence may be removed from a painted or enameled surface without injury to the paint or enamel. Likewise, the solvent in shoe polish will remove the present coating when applied thereover, thus making it possible to rewax shoes without resorting to powerful solvents to first remove the present protective coating.

Although it is believed from the foregoing description, those skilled in the art will be readily able to formulate the composition of the present invention, in order to more clearly describe this composition and its various uses, the following specific examples are offered:

*Example I*

A dry mixture is made having the following composition in parts by weight:

| | Parts by weight |
|---|---|
| Chlorinated paraffin wax (containing 70% by weight chemically combined chlorine) | 80 |
| Polyvinyl acetate | 19.5 |
| Soya modified alkyl resin [1] (containing 70% solids by weight and carrying 23% phthalic anhydride) | .5 |

[1] General Electric Co. Resin #2466 specific gravity—1.05. Oil acids content—60%.

40 parts by weight of the above mixture is added to 60 parts by weight of toluene, and the resulting mixture is agitated until all of the solids are dissolved in the toluene. The resulting solution is found to be compatible with the following aerosol components: methylene chloride, trichlorofluoromethane (propellant 11), and dichlorodifluoromethane (propellant 12). Upon applying the above solution to a pair of leather shoes by means of an aerosol spray, a clear, colorless, glossy, hard, flexible coating is formed within 60 seconds after application. Similar results are obtained after applying the composition to various metals including aluminum, steel, chromium, brass, copper, magnesium, and tin.

*Example II*

A dry mixture is made having the following composition in parts by weight:

| | Parts by weight |
|---|---|
| Chlorinated paraffin wax (containing 70% by weight of chemically combined chlorine) | 78.75 |
| Polyvinyl acetate | 17.5 |
| Butyl benzyl phthalate [1] | 3.625 |
| Silicone resin [2] | .125 |

[1] Sanitizer 160.
[2] Dow Corning F-121.

40 parts by weight of the above composition are added to 60 parts by weight of toluene and the resulting mixture is agitated until all of the solid material is dissolved. The resulting solution is found to be compatible with the following aerosol components: methylene chloride, trichlorofluoromethane (propellant 11), and dichlorodifluoromethane (propellant 12). Upon applying a coating of the above solution to a pair of leather shoes by means of an aerosol spray, a clear, colorless, glossy, hard, flexible coating is formed within 60 seconds after application. Similar results are obtained after applying the above composition to various metals including aluminum, steel, chromium, brass, copper, magnesium, and tin.

*Example III*

A dry mixture is made having the following composition in parts by weight:

| | Parts by weight |
|---|---|
| Chlorinated paraffin wax (containing 70% by weight of chemically combined chlorine) | 79.15 |
| Polyvinyl acetate | 18.125 |
| Butyl benzyl phthalate [1] | 1.00 |
| Silicone resin [2] | .125 |
| Soya modified alkyd resin [3] (containing 70% solids by weight and carrying 23% phthalate anhydride) | .5 |
| Lead naphthanate | .25 |
| Cobalt naphthanate | .25 |

[1] Sanitizer 160.
[2] Dow Corning F-121.
[3] General Electric Co. Resin #2466.

40 parts by weight of the above composition is added to 60 parts by weight of toluene, and the resulting mixture is agitated until all of the solid material is dissolved. The resulting solution is found to be compatible with the following aerosol components: methylene chloride, trichlorofluoromethane (propellant 11), and dichlorodifluoromethane (propellant 12). Upon applying the above composition to a pair of leather shoes by means of aerosol spray, a clear, colorless, glossy, hard, flexible coating is formed within 60 seconds of application. Similar results are obtained upon applying the above composition to various metals including aluminum, steel, chromium, brass, copper, magnesium, and tin.

*Example IV*

A dry mixture having the following composition in parts by weight is made:

| | Parts by weight |
|---|---|
| Chlorinated paraffin wax (containing 70% by weight of chemically combined chlorine) | 79.9 |
| Polyvinyl acetate | 19.0 |
| Silicone resin [1] | .10 |
| Polyvinyl stearate | 1.00 |

[1] Dow Corning F-121.

40 parts by weight of the above mixture is added to 60 parts by weight of toluene, and the resulting mixture is agitated until all of the solid components are dissolved. The resulting solution is found to be compatible with the following aerosol components: methylene chloride, trichlorofluoromethane (propellant 11), and dichlorodifluoromethane (propellant 12). Upon applying the above solution to a pair of leather shoes by means of an aerosol spray, a clear, colorless, glossy, hard, flexible coating is formed within 60 seconds after application. Similar results are obtained upon applying the above solution to various metals including aluminum, steel, chromium, brass, copper, magnesium, and tin.

*Example V*

A dry mixture is made having the following composition and parts by weight:

| | Parts by weight |
|---|---|
| Chlorinated paraffin wax (containing 70% by weight of chemically combined chlorine) | 80 |
| Polyvinyl acetate | 19 |
| Silicone resin [1] | .125 |
| Cobalt naphthanate | .200 |
| Lead naphthanate | .200 |
| Polyoxyethylene sorbitan monolaurate | .475 |

[1] Dow Corning F-121.

40 parts by weight of the above composition is added to 60 parts by weight of toluene, and the resulting mixture is agitated until all solid material is dissolved. The resulting solution is found to be compatible with the following aerosol components: methylene chloride, trichlorofluoromethane (propellant 11), and dichlorodifluoromethane (propellant 12). Upon applying the above solution to a pair of leather shoes by means of aerosol spray, a clear, colorless, glossy, hard, flexible coating is formed within 60 seconds after application. Similar results are obtained upon applying the above solution to various metals including aluminum, steel, chromium, brass, copper, magnesium, and tin.

*Example VI*

To illustrate the adaptability of the composition of the present invention in producing a colored coating, to each of the compositions of Examples I through V, prior to aerosol packaging, the following oil-soluble dyes, respectively, are added in amounts of .02 mg. per 100 ml. of solution: Oil yellow C.I. 19, Oil red C.I. 258, Sudan black B, Sudan blue GL, and Sudan green BB. Upon aerosol spraying of each of the colored compositions on the surfaces indicated in the foregoing examples, a glossy, hard, flexible, colored film is produced within 60 seconds of application.

*Example VII*

A dry mixture is made having the following composition in parts by weight:

| | Parts by weight |
|---|---|
| Chlorinated paraffin wax (containing 70% by weight of chemically combined chlorine) | 99 |
| Polyvinyl stearate | 1 |

40 parts by weight of the above composition are added to 60 parts by weight of toluene, and the resulting mixture is agitated until all of the solid components are dissolved. The resulting solution is found to be compatible with the following aerosol components: methylene chloride, trichlorofluoromethane (propellant 11), and dichlorodifluoromethane (propellant 12). Upon applying the above solution to a pair of leather shoes, by means of an aerosol spray, a clear, colorless, glossy, hard, flexible coating is formed within 60 seconds after application. Similar results are obtained upon applying the above solution to various metals including aluminum, steel, chromium, brass, copper, magnesium, and tin.

*Example VIII*

To each of the solvent solutions of Examples I–V is added 10% by weight of ground titanium dioxide pigment. The resulting mixtures are agitated until all of the pigment is dissolved. Upon applying the resulting solutions, by means of aerosol spray, to six strips of white pine, in each instance a hard, flexible, glossy, white coating is formed within 60 seconds after application. The above illustrates the compatibility of pigments in the composition of the present invention.

It has been found that the coating composition of the present invention, when sprayed, as from an aerosol container, is non-flammable as well as non-toxic by either inhalation or contact. Additionally, it will be seen that the present composition may be used to give either a clear, colorless coating, or one which has any color that is desired. Moreover, the present composition may be applied to a variety of surfaces, including metals, plastic, rubber, leather, paper, cloth, and wood, with equal ease and the same superior results. Because of this variety of surfaces which may be cover, it will be apparent that the present composition has a wide variety of uses, some of which have been set forth in the description above, as well as others which will become apparent to those skilled in the art.

It is to be understood that although the invention has been described with specific reference to particular embodiments thereof, it is not to be so limited since changes and alterations therein may be made which are within the full intended scope of this invention as defined by the appended claims.

What is claimed is:

1. An aerosol sprayable coating composition comprising from 60–99% by weight of the total composition of a chlorinated paraffin wax containing 66–80% by weight of chemically combined chlorine and having from 18–36 carbon atoms in the molecule thereof, 1–40% by weight of the total composition of a film-forming agent selected from the group consisting of polyvinyl acetate and polyvinyl stearate and 1–5% by weight of the total composition of a material selected from the group consisting of plasticizers, dryers, "slip" agents, and mixtures thereof, 5–40% by weight of said composition being dispersed in 60–95% by weight of a solvent.

2. The composition as claimed in claim 1 which additionally contains an oil-soluble dye in the amount of .02 mg. of dye per 100 ml. of solution.

3. The composition as claimed in claim 2 which additionally contains from .1 to 1% by weight of the total composition of an ultraviolet-absorbing agent.

4. The composition as claimed in claim 1 which additionally contains 10% by weight of the total composition of a pigment.

5. The composition as claimed in claim 1 which additionally contains .1 to 1% by weight of the total composition of an ultraviolet-absorbing agent.

6. An aerosol sprayable coating composition comprising from 79–80% by weight of the total composition of a chlorinated paraffin wax containing 66–80% of chemically combined chlorine and having from 18–36 carbon atoms in the molecule thereof, 19–20% by weight of the total composition of polyvinyl acetate as a film-forming agent, and 1–2% by weight of the total composition of a material selected from the group consisting of plasticizers, dryers, "slip" agents, and mixtures thereof, 35–40% by weight of said composition being dispersed in 60–65% by weight of a solvent.

7. The composition as claimed in claim 6 which additionally contains from .1 to 1% by weight of the total composition of an ultraviolet-absorbing agent.

8. The composition as claimed in claim 6 which additionally contains 10% by weight of the total composition of a pigment.

9. The composition as claimed in claim 6 which additionally contains from .1 to 1% by weight of the total composition of an ultraviolet-absorbing agent.

10. An aerosol sprayable coating composition having the following composition in parts by weight:

| | Parts by weight |
|---|---|
| Chlorinated paraffin wax (containing 70% by weight chemically combined chlorine) | 80 |
| Polyvinyl acetate | 19.5 |
| Soya modified alkyd resin (containing 70% solids by weight and carrying 23% phthalic anhydride) | .5 |

40 parts by weight of said composition being dispersed in 60 parts by weight of toluene.

11. An aerosol sprayable coating composition having the following composition in parts by weight:

| | Parts by weight |
|---|---|
| Chlorinated paraffin wax (containing 70% by weight of chemically combined chlorine) | 78.75 |
| Polyvinyl acetate | 17.5 |
| Butyl benzyl phthalate | 3.625 |
| Silicone resin | .125 |

40 parts by weight of said composition being dispersed in 60 parts by weight of toluene.

12. An aerosol sprayable coating composition having the following composition in parts by weight:

| | Parts by weight |
|---|---|
| Chlorinated paraffin wax (containing 70% by weight of chemically combined chlorine) | 79.15 |
| Polyvinyl acetate | 18.125 |
| Butyl benzyl phthalate | 1.00 |
| Silicone resin | .125 |
| Soya modified alkyd resin (containing 70% solids by weight and carrying 23% phthalate anhydride) | .5 |
| Lead naphthanate | .25 |
| Cobalt naphthanate | .25 |

40 parts by weight of said composition being dispersed in 60 parts by weight of toluene.

13. An aerosol sprayable coating composition having the following composition in parts by weight:

| | Parts by weight |
|---|---|
| Chlorinated paraffin wax (containing 70% by weight of chemically combined chlorine) | 79.9 |
| Polyvinyl acetate | 19.0 |
| Silicone resin | .10 |
| Polyvinyl stearate | 1.00 |

40 parts by weight of said composition being dispersed in 60 parts by weight of toluene.

14. An aerosol sprayable coating composition having the following composition in parts by weight:

| | Parts by weight |
|---|---|
| Chlorinated paraffin wax (containing 70% by weight of chemically combined chlorine) | 80 |
| Polyvinyl acetate | 19 |
| Silicone resin | .125 |
| Cobalt naphthanate | .200 |
| Lead naphthanate | .200 |
| Polyoxyethylene sorbitan monolaurate | .475 |

40 parts by weight of said composition being dispersed in 60 parts by weight of toluene.

15. An aerosol sprayable coating composition having the following composition in parts by weight:

| | Parts by weight |
|---|---|
| Chlorinated paraffin wax (containing 70% by weight of chemically combined chlorine) | 99 |
| Polyvinyl stearate | 1 |

40 parts by weight of said composition being dispersed in 60 parts by weight of toluene.

16. The composition as claimed in claim 6 which additionally contains an oil-soluble dye in the amount of .02 mg. of dye per ml. of solution.

References Cited in the file of this patent

UNITED STATES PATENTS

| 2,276,094 | Rothrock | Aug. 24, 1939 |
| 2,536,349 | Brush | Jan. 2, 1951 |
| 2,680,723 | Kronstein | Aug. 17, 1951 |
| 2,669,521 | Bierly | Feb. 16, 1954 |
| 2,900,361 | Havens | Aug. 18, 1959 |
| 2,904,529 | Gordon | Sept. 15, 1959 |

UNITED STATES PATENT OFFICE
CERTIFICATE OF CORRECTION

Patent No. 3,012,980                                                    December 12, 1961

John E. Dereich

It is hereby certified that error appears in the above numbered patent requiring correction and that the said Letters Patent should read as corrected below.

Column 1, line 48, for "plaint" read -- paint --; column 2, line 48, strike out "it has"; column 3, line 59, for "deleteroiusly" read -- deleteriously --; column 4, line 11, for "alkyl" read -- alkyd --; column 8, line 40, after "per" insert -- 100 --.

Signed and sealed this 19th day of June 1962.

(SEAL)
Attest:

ERNEST W. SWIDER                                                    DAVID L. LADD
Attesting Officer                                                        Commissioner of Patents